2,975,167
MONOAZO DYESTUFFS

Hans Rudolf Schwander, Basel, Jean-Pierre Jung, Riehen, near Basel, and Peter Hindermann, Basel, Switzerland, assignors to J. R. Geigy A.-G., Basel, Switzerland No Drawing. Filed Apr. 17, 1959, Ser. No. 806,999

Claims priority, application Switzerland Apr. 23, 1958

6 Claims. (Cl. 260—199)

The present invention concerns new dyestuffs, which are particularly valuable for textile dyeing and printing, especially for polypeptide groups containing fibrous material, since excellent fast to washing dyeings and prints can be produced with them, and also methods for producing them.

It has been found that monoazo dyes can be converted into valuable new dyestuffs by the introduction of halogen acyl-aminomethyl groups. The reaction products according to the present invention correspond to the formula

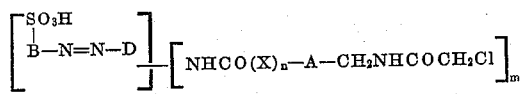

wherein
B represents a mononuclear carbocyclic aryl radical containing the sulpho group in o-position to the azo group,
D represents the radical of a coupling component,
A represents an aryl radical of the benzene series,
X represents an aliphatic radical,
$n$ represents one of the numerals 0 and 1, and
$m$ represents a low whole number.

Particularly valuable wool dyestuffs are those compounds which contain in the benzene nucleus of the aryl radical A at least one positivating substituent apart from the characteristic $ClCH_2$—CO—NH—$CH_2$— group, as these dyestuffs are especially distinguished by their good fastness to light.

The new monoazo dyestuffs according to the present invention are obtained by coupling to the monoazo dyestuff an o-diazobenzene sulphonic acid and an azo component, one of which or both components contain an amino group which can be acylated, and treating before or after the coupling the components or the dyestuff with a reactive derivative of a carboxylic acid, of the formula I

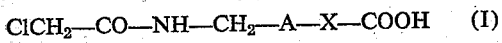

in which
A represents an aryl radical, containing preferably a positivating substituent, and
X represents the direct linkage or an organic acyclic bridge member, under such conditions that the end product contains at least one acyl radical of the formula

bound to an amino group.

The carboxylic acids of the general Formula I, from which the acylating agents used according to the present invention are derived, are for the greater part new compounds. They are obtained from the corresponding carboxylic acids of the formula H—A—X—COOH, wherein A and X have the meanings already given above and wherein H represents a replaceable hydrogen atom, by condensation with N-methylol-ω-chloro-acetamide. The condensation takes place under conditions as described by A. Einhorn (Annalen 343, 207 (1905) and ibid. 361, 113 (1908)) for the reaction of the latter compound with aromatic substances. According to the above formula, the carboxyl group can be bound in the carboxylic acids besides by direct linkage also by means of an acyclic bridge member to the aryl radical. Such bridge members are, for example, low molecular aliphatic radicals which may be interrupted by hetero atoms. Examples of aromatic carboxylic acids containing carboxyl groups bound in such a manner are: aryl acetic acids, aryl propionic acids, aryloxy acetic acids and arylthio acetic acids. The aryl radicals themselves contain preferably one nucleus, i.e. are phenyl radicals. But they can also be built up of several nuclei, whereby particularly diphenyl, diphenyl ether, diphenyl ketone, aroylamino phenyl and naphthyl radicals are considered.

The aryl radicals of the acylating agents preferably contain positivating, i.e. nucleophilic substituents. Examples of such are: low molecular alkyl groups, preferably methyl groups, or substituents which are bound to the aryl radical by means of an ether oxygen atom, an ether sulphur atom or an amide nitrogen atom.

When condensing N-methylol-ω-chloro-acetamide with aryl compounds substituted in such a manner, the $ClCH_2$—CO—NH—$CH_2$-group predominantly occupies the o-position, but may also take the p-position to such a nucleophilic substituent.

The required reactive derivatives of the carboxylic acids of the Formula I are prepared according to the usual methods known per se. In the present process, acid halides above all may be used as such derivatives. The carboxylic acid chlorides preferably used are obtained in the simplest manner by reacting thionyl chloride on the carboxylic acids in an organic solvent while slightly heating. The 3-chloro-acetylamino-methyl-4-methyl benzoic acid chloride is a particularly valuable and easily accessible acylating agent.

In the process according to the present invention, amino-benzene compounds, which contain a sulphonic acid group in o-position to the diazotisable amino group, can be used as diazo components. Preferably the not further substituted 2-amino-benzene-1-sulphonic acid itself, or also its low molecular homologues, such as 5-methyl-2-amino-benzene-1-sulphonic acid, is used. The easily accessible 2.4- or 2.5-diamino-benzene-1-sulphonic acids are preferred as starting materials when the diazo component also contains an acylated amino group according to the present invention. Also nitro-2-amino-benzene-1-sulphonic acids can be used as diazo components, being coupled—after diazotization—with an azo component to yield the nitromonoazo dyestuff. The latter is reduced to the aminoazo dyestuff and then acylated according to the present invention.

In the present process, the hydroxy or amino compounds of the benzene, naphthalene and pyrazole series, or the derivatives thereof acylated according to the present invention, all of which are capable of conventional coupling, are used as azo components. The use of hydroxy-naphthalene-sulphonic acids and amino-hydroxy-naphthalene-sulphonic acids is preferred, particularly when these contain a hydroxy group in an α-position and a sulphonic acid group in a m-position to this hydroxy group. Preferable coupling components or precursors thereof are, for example: 1-amino- or 2-amino-8-hydroxy-naphthalene-6-sulphonic acid, 2-amino-5-hydroxy-naphthalene-7-sulphonic acid, 1-amino-8-hydroxy-naphthalene-3.6- or 4.6-disulphonic acid and 2-amino-8-hydroxy-naphthalene-3.6-disulphonic acid.

The acylation of the diazo and/or azo components or of the monoazo dyestuffs according to the present invention, by means of the reactive derivatives of carboxylic acids of the Formula I, takes place under the conditions usual for this type of reaction. The carboxylic acid halides, for example, are reacted with the components containing sulphonic acid groups, in aqueous solution or suspension and in organic or aqueous-organic solvents with the unsulphonated components at low temperatures of approximately 0–10°. A mineral acid binding agent, such as e.g. sodium acetate or pyridine, is added advantageously. Often the corresponding acyl derivatives precipitate from the reaction solutions, and often their separation is favoured or completed by salting out. The separation from the organic solvent takes place by evaporation of the solvents, possibly also by dilution with water and consequent salting out. If, instead of the aminomonoazo dyestuffs, the corresponding amino group containing diazo and/or azo components are acylated according to the present invention, the two components have to be coupled to form the dyestuff. Diazotization of the amines entering into consideration and coupling of the resultant diazo components with the azo components are carried out according to the methods known for the preparation of monoazo dyestuffs, and under the usual conditions. Further details can be taken from the following examples.

Monoazo dyestuffs according to the present invention may also be prepared by a slightly modified process, which consist in reacting an acylaminomonoazo dyestuff of the Formula II $$F—(NH—CO—X—A—H)_n \quad (II)$$

wherein

F represents the monoazo dyestuff radical of ano-diazobenzene sulphonic acid and of an azo component, and
$n$ represents a low whole number, wherein X and A have the meanings given above, with N-methylol-ω-chloro-acetamide under such conditions that at least one chloro-acetylamino-methyl group is introduced. The reaction is preferably carried out in the presence of acid condensing agents, such as, for instance, anhydrous sulphuric acid, at low temperatures, i.e. under conditions as described by Einhorn and also as applied for the preparation of the above named acylating agents. In particular, those monoazo dyestuffs are suitable for this modified process of manufacture which do not contain free amino groups any more, as, on using monoazo dyestuffs of this kind, possible side reactions are reduced to the minimum.

The monoazo dyestuffs obtained according to the present invention are easily water-soluble, yellow to red-brown powders. They are suitable for the dyeing and printing of fibrous material of the various kinds. But they are preferably used for the dyeing of wool or similar nitrogen-containing fibres, as on this material very pure, even and good fast to light dyeings are obtained with them. The yellow, orange, red to bluish-red wool dyeings show very good fastness to washing and to milling, particularly in the alkaline range. The new dyestuffs containing sulphonic acid groups are used on wool preferably according to the simple and fibre-preserving dyeing method from a weakly acid aqueous bath heretofore employed when dyeing with wool dyestuffs containing no sulphonic acid groups. Sometimes it is indicated to dye in the presence of compounds containing an organic lipophilic radical and polyalkyleneoxide groups known as equalizing agent. Often, also an addition of organic substances containing basic nitrogen is of advantage. However, an after treatment, in particular an alkaline treatment, is not necessary, since even in the absence thereof the dyeings already have a good fastness to rubbing and to wetting.

Particularly valuable are dyestuffs which correspond to the formula

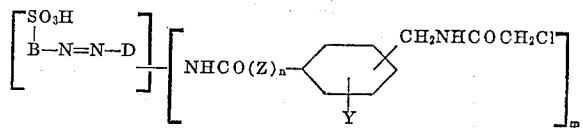

wherein

B represents a mononuclear carbocyclic aryl radical containing the sulpho group in o-position to the azo group,
D represents the radical of a coupling component selected from the group consisting of the naphthalene and pyrazole series,
Z represents a member selected from the group consisting of alkylene, alkyleneoxy and phenyl radicals,
Y represents a member selected from the group consisting of lower alkyl, lower alkoxy and acylaminomethyl radicals,
$n$ represents one of the numerals 0 and 1, and
$m$ represents one of the numerals 1 and 2.

Among these dyestuffs those are preferred in which D represents a naphtholic coupling component, and which contain only one acylamino radical corresponding to the formula

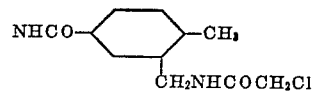

The following examples illustrate the invention without limiting it in any way. Parts are given as parts by weight, unless expressly stated otherwise, and their relationship to parts by volume is as that of grammes to cubic centimetres. The temperatures are in degrees centigrade.

EXAMPLE 1

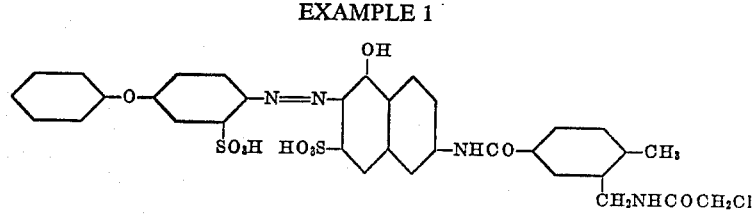

26.5 parts of 4-amino-diphenylether-3-sulphonic acid are dissolved as sodium salt in 400 parts of water. To this solution are added 6.9 parts of sodium nitrite, and the mixture is added dropwise at 0–8° to 30 parts of concentrated hydrochloric acid and 100 parts of ice. After stirring for one hour at 0–5° and destroying the nitrous acid in excess, the colourless diazonium salt suspension is introduced into an acetic acid suspension of 46.25 parts of 2-(4′-methyl-3′-chloro-acetylamino-methyl-benzoylamino)-5-hydroxy-naphthalene-7 - sulphonic acid and 25 parts of crystallised sodium acetate in 500 parts of water. The mixture is stirred for several hours at 10–15°, after which 120 parts of sodium chloride are added. The separated dyestuff is filtered off under suction, washed with a 2% aqueous solution of sodium chloride till the reaction is neutral and dried at 80–85° in the vacuum.

The red-orange monoazo dyestuff is easily soluble in hot water and dyes wool from a boiling acetic acid dye bath in pure, red-orange shades. The wool dyeings are fast to light and to washing.

The above used 2-(4′-methyl-3′-chloro-acetylamino-methylbenzoylamino) - 5 - hydroxy-naphthalene-7-sulphonic acid may be prepared as follows: 23.9 parts of 2-amino-5-hydroxy-naphthalene-7-sulphonic acid are dissolved in 500 parts of water as sodium salt, to which solution 40 parts of crystallised sodium acetate are added and cooled to 0–2°. A solution of 26.0 parts of 4-methyl- 3-chloro-acetylaminomethyl-benzoylchloride (M.P. 108–110°) in 100 parts of acetone is added dropwise within an hour to this mixture. The sodium salt of the condensation product slowly separates, and after stirring for 6–8 hours at 0–5° the condensation is terminated. The precipitate is filtered off, washed with a 20% aqueous solution of sodium chloride until colourless and then the 2-(4′ - methyl-3′-chloro-acetylaminomethyl-benzoylamino) - 5 - hydroxy-naphthalene-7-sulphonic acid is dried in the vacuum at a temperature of 80–85°.

EXAMPLE 2

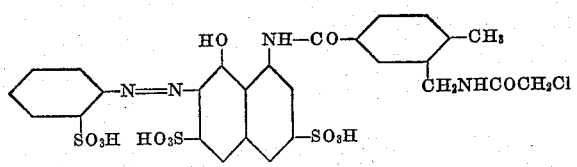

17.3 parts of 2-aminobenzene-1-sulphonic acid are dissolved as sodium salt in 200 parts of water. 6.9 parts of sodium nitrite are added to this solution, and the whole is added dropwise while stirring and exterior cooling at a temperature of 0–5° to the mixture of 30 parts of concentrated hydrochloric acid and 100 parts of ice. The colourless suspension is then stirred at a temperature of 0–5° for an hour, whereupon the excess nitrous acid is destroyed. Thereafter, the diazonium salt suspension is introduced slowly, while stirring, at a temperature of 5–10° into the acetic acid suspension of 54.25 parts of 1 - (4′-methyl - 3′-chloro-acetylaminomethyl-benzoylamino)-8-hydroxy-naphthalene-3.6 - disulphonic acid and 40 parts of crystallised sodium acetate in 500 parts of water. After stirring the mixture for 8 hours at a temperature of 20–25°, the dyestuff is salted out by an addition of 120 parts of sodium chloride, filtered off by suction, washed with a 15% aqueous solution of sodium chloride until the reaction is neutral and dried in the vacuum at a temperature of 80–85°. The red dyestuff is soluble in hot water and dyes wool from an acid bath in pure, bluish-red shades. The wool dyeings have a very good wet and light fastness.

EXAMPLE 3

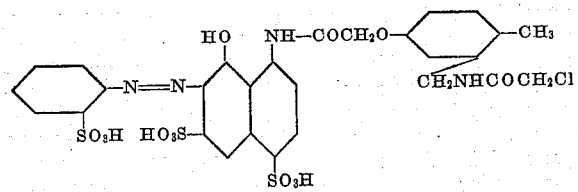

17.3 parts of 2-aminobenzene-1-sulphonic acid are, as described in Example 2, diazotised in 200 parts of water with 6.9 parts of sodium nitrite and 25 parts of concentrated hydrochloric acid. The colourless diazonium salt suspension is poured slowly, while stirring, at a temperature of 10–15° into the acetic acid suspension of 57.25 parts of 1-(4′ - methyl-3′-chloro-acetylamino-methyl-phenoxyacetylamino) - 8 - hydroxy-naphthalene-3.6-disulphonic acid and 50 parts of crystallised sodium acetate in 500 parts of water. The red monoazo dyestuff so formed separates as a red suspension. The whole is stirred for several hours at a temperature of 15–20°, heated to 50°, whereupon 150 parts of sodium chloride are added. Then the precipitated dyestuff is filtered off under suction and dried in the vacuum at a temperature of 80–85°. The red monoazo dyestuff is easily soluble in warm water and dyes wool from an acid boiling bath in pure, bluish-red, light and wet-fast shades.

EXAMPLE 4

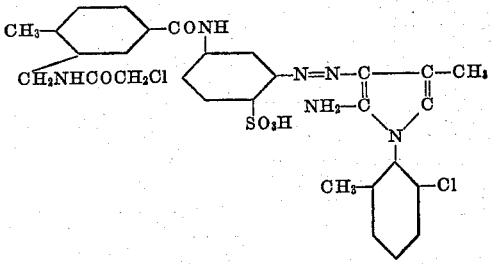

41.15 parts of 2-amino-4-(4′-methyl-3′-chloro-acetyl-amino-methyl-benzoylamino)-benzene - 1 - sulphonic acid are dissolved as sodium salt in 500 parts of water at a temperature of 50°. 6.9 parts of sodium nitrite are added to this solution and the warm mixture is added dropwise at a temperature of 0–10° while stirring and exterior cooling to 30 parts of concentrated hydrochloric acid and 200 parts of ice. After stirring for one hour at a temperature of 0–5°, the excess nitrous acid possibly present is destroyed and the colourless diazonium salt suspension is poured into the solution of 22.15 parts of 1-(2′ - chloro - 6′ - methylphenyl)-3-methyl-5-amino-pyrazole and 25 parts of crystallised sodium acetate in 400 parts of ethanol. A yellow dyestuff is formed immediately. The stirring is continued for 6 hours at room temperature, whereupon the mixture is diluted with 1000 parts of water. The dyestuff is salted out with 150 parts of sodium chloride, then filtered off under suction, washed with a 2% aqueous solution of sodium chloride and dried in the vacuum at a temperature of 80–85°.

The yellow dyestuff dissolves in hot water showing a greenish-yellow colour and dyes wool from a boiling bath containing ammonium sulphate in even, pure, greenish-yellow shades, which are very fast to light and to alkali.

The above used 2-amino-4-(4′-methyl-3′-chloro-acetyl-amino-methyl-benzoylamino)-benzene - 1 - sulphonic acid is obtained as follows: 24.15 parts of 4-methyl-3-chloro-acetaminomethyl-benzoic acid (M.P. 223–224°) are suspended in 150 parts of chloroform and treated at a temperature of 45–50° with 14 parts of thionyl chloride. After solution has occurred and the formation of hydrochloric acid has stopped, the chloroform is separated by distillation, the remaining 4-methyl-3-chloro-acetamino-methyl-benzoylchloride dissolved in 100 parts of acetone and reacted in an acetic acid solution with 18.8 parts of 2.4-diamino-benzene-1-sulphonic acid and 40 parts of crystallised sodium acetate in 500 parts of water at a temperature of 0–5°. After the amino group in 4-position has completely been benzoylated, the separated reaction product is filtered off under suction, washed with a 10% aqueous solution of sodium chloride and dried in the vacuum at a temperature of 75–80°.

EXAMPLE 5

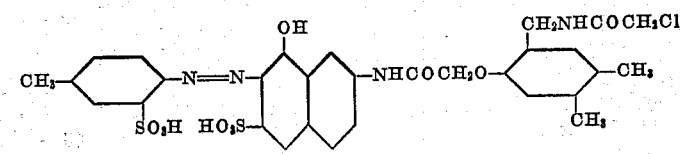

18.7 parts of 5-methyl-2-aminobenzene-1-sulphonic acid are, as described in Example 2, diazotised in 200 parts of water with 6.9 parts of sodium nitrite and 25 parts of concentrated hydrochloric acid. The colourless suspension is poured gradually while stirring at a temperature of 10–15° into an alkaline solution of 23.9 parts of 2-amino-8-hydroxy-naphthaline-6-sulfonic acid and 25 parts of sodium carbonate in 500 parts of water. After coupling is completed, 15 parts of 80% acetic acid and 40 parts of crystallised sodium acetate are added to the orange dyestuff solution. The mixture is cooled to a temperature of 0–5° and reacted with a solution of 30.4 parts of 3.4-dimethyl-6-chloro-acetaminomethyl-phenoxy-acetylchloride in 100 parts of acetone. After the amino group has completely been benzoylated, the dyestuff is salted out by addition of 150 parts of sodium chloride, filtered off and dried in the vacuum at a temperature of 70–80°. The dyestuff is a brown powder, which dissolves in hot water with an orange colour and dyes wool from a weakly acid boiling bath in pure, red-organge, light and wet-fast shades.

This dyestuff can also be obtained in an analogous manner to the method described in Examples 2 and 3 by starting from 18.7 parts of diazotised 5-methyl-2-amino-benzene-1-sulphonic acid and coupling with 50.65 parts of 2-(3',4'-dimethyl - 6' - chloro-acetylaminomethylphenoxyacetylamino)-8-hydroxy-naphthalene - 6 - sulphonic acid.

EXAMPLE 6

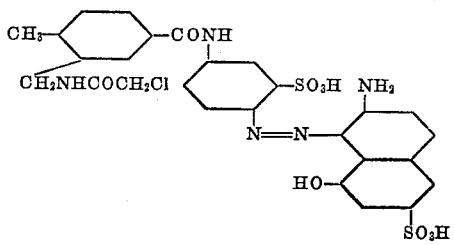

41.15 parts of 2-amino-5-(4'-methyl-3'-chloro-acetyl-aminomethyl-benzoylamino)-benzene - 1 - sulphonic acid are dissolved as sodium salt at a temperature of 50° in 500 parts of water, and 6.9 parts of sodium nitrite are added to the solution. The warm solution is added dropwise while stirring and exterior cooling at a temperature of 0–10° to 30 parts of hydrochloric acid and 200 parts of ice. After stirring for one hour at a temperature of 0–5°, the excess nitrous acid is destroyed and the aqueous suspension of the diazonium salt is mixed with an acetic acid solution of 23.9 parts of 2-amino-8-hydroxy-naphthalene-6-sulphonic acid and 25 parts of crystallized sodium acetate in 500 parts of water. A red dyestuff is formed immediately. After stirring for 8 hours at room temperature, the precipitated monazo dyestuff is filtered off, washed well with a 5% aqueous solution of sodium chloride and dried in the vacuum at a temperature of 80–85°.

The dry sodium salt of the dyestuff represents a red-brown powder which dissolves in hot water with a red colour and dyes wool from an acetic acid boiling bath in even, pure, very bluish-red shades. The dyes are fast to light, washing and milling.

If, instead of 23.9 parts of 2-amino-8-hydroxy-naphthalene-6-sulphonic acid, 32.8 parts of 2-amino-8-hydroxy-naphthalene-6-sulphonic acid N-methyl-phenylamide or 35.6 parts of 2-amino-8-hydroxy-naphthalene-6-sulphonic acid N-ethyl-2'-methylphenylamide or 42.2 parts of 2-amino-8-hydroxy-naphthalene-6-sulphonic acid N-ethyl-p'-sulphophenylamide are used, more yellowish dyeings with excellent light and wet-fastness properties are obtained.

EXAMPLE 7

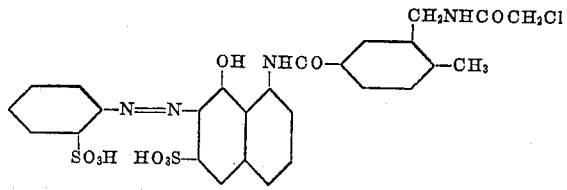

62.1 parts of the monoazo dyestuff obtained by acetic acid coupling from diazotised 2-aminobenzene-1-sulphonic acid and 1-(4'-methylbenzoylamino)-8-hydroxy-naphthalene-3,6-disulphonic acid are dissolved at a temperature of 0–5° in 550 parts of concentrated hydrochloric acid (d. 1.84). 12.5 parts of N-methylol-chloro-acetamide (M.P. 97–98°) are added to this solution, the temperature of the mixture is allowed to rise to 15–20° while slowly stirring for 48 hours, and then the mixture is poured on to ice. The dyestuff partly dissolved. The dyestuff is salted out with sodium chloride, filtered off and dried in the vacuum at a temperature of 35–40°. A brown powder is obtained, which dissolves in hot water and in concentrated hydrochloric acid with a scarlet-red colour. The monoazo dyestuff dyes wool from an acid boiling bath in pure, bluish-red shades. The wool dyeings are very fast to light and to wet.

If, instead of 62.1 parts of the above dyestuff, 54.1 parts of the monoazo dyestuffs obtained by acetic acid coupling of 2-amino - 5 - (4'-methylbenzoylamino)-benzene-1-sulphonic acid or 2-amino-4-(4'-methylbenzoylamino)-benzene-1-sulphonic acid with 1-hydroxy-naphthalene-3-sulphonic acid are used, and these dyestuffs are condensed, as described in the above example, with N-methylol-chloroacetamide, orange dyestuffs with similar good wet and light-fastness properties are obtained.

EXAMPLE 8

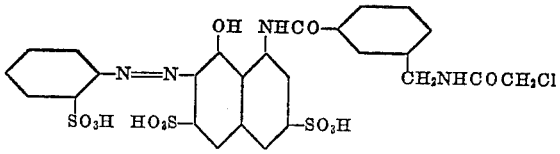

22.8 parts of 3-chloro-acetamino-methyl benzoic acid (M.P. 176°) are suspended in 100 parts of chloroform and this suspension is treated at a temperature of 45–50° with 12 parts of thionylchloride. After everything has gone into solution and the formation of hydrochloric acid has stopped, the chloroform is distilled off and the remaining 3-chloro-acetamino-methyl-benzoylchloride is reacted at a temperature of 0–5° in a weakly alkaline solution with 31.9 parts of 1-amino-8-hydroxy-naphthalene-3.6-disulphonic acid. After the amino group has completely been benzoylated, 25 parts of crystallised sodium acetate and then the diazonium compound of 17.3 parts of 2-aminobenzene-1-sulphonic acid are added to the reaction product. The red monoazo dyestuff is separated by means of sodium chloride, filtered off and dried in the vacuum at a temperature of 35–40°. A brown powder is obtained, which dissolves in water and concentrated sulphuric acid with a red colour. The bluish-red wool dyeing produced with this dyestuff is excellently wet-fast.

EXAMPLE 9

100 parts of well prewetted wool are entered at a temperature of 40° into a dye bath, containing in 3000 parts of water 2 parts of the monoazo dyestuff obtained according to Example 2, 10 parts of Glauber's salt and 2 parts of 40% acetic acid. The bath is brought to the boil within 45 minutes, and the temperature maintained for one and a half hours while well moving the wool. After rinsing and drying, a very even, pure, bluish-red wool dyeing, having excellent fastness properties, is obtained.

The dyestuffs of all the other examples can be dyed on wool in a similar manner.

The table below shows further dyestuffs according to the present invention, which may be obtained by the use of corresponding amounts of diazo and azo components according to the methods described in Examples 1–5.

Table

| No. | diazo component | azo component | shade of the wool dyeing |
|---|---|---|---|
| 1 | 2-amino-5-methyl-benzene-1-sulphonic acid. | 1-(4'-methyl-3'-chloro-acetylaminomethyl-benzoylamino)-8-hydroxy-naphthalene-3.6-disulphonic acid. | bluish-red. |
| 2 | 2-amino-5-carbethoxy-amino-benzene-1-sulphonic acid. | ----do---- | Do. |
| 3 | 2-amino-benzene-1-sulphonic acid. | 2-(4'-methyl-3'-chloro-acetylaminomethyl-phenoxy-acetyl-amino)-5-hydroxy-naphthalene-7-sulphonic acid. | orange. |
| 4 | 2-amino-5-methyl-benzene-1-sulphonic acid. | ----do---- | red-orange. |
| 5 | 2-amino-benzene-1-sulphonic acid. | 2-[4',X'-di-(chloro-acetylamino-methyl)-phenoxy-acetylamino]-5-hydroxy-naphthalene-7-sulphonic acid. | orange. |
| 6 | ----do---- | 1-[4''-methyl-3''-chloroacetylamino-methyl-xenyl-(4')-carbonyl-amino]-8-hydroxy-naphthalene-3.6-disulphonic acid. | bluish-red. |
| 7 | 2-amino-5-(4'-methoxy-3'-chloro-acetylamino-methyl-benzoyl-amino)-benzene-1-sulphonic acid. | 1-benzoylamino-8-hydroxy-naphthalene-3.6-disulphonic acid. | Do. |
| 8 | ----do---- | 1-(3'-chloro-6'-sulpho-phenyl)-3-methyl-5-amino-pyrazole. | greenish-yellow. |
| 9 | 2-amino-4-(4'-methyl-3'-chloro-acetyl-aminomethyl-benzoylamino)-benzene-1-sulphonic acid. | 1-(4'-methyl-3'-chloro-acetylamino-methyl-benzoyl-amino)-8-hydroxy-naphthalene-3.6-disulphonic acid. | bluish-red. |
| 10 | 2-amino-4-(4'-butyl-3'-chloro-acetyl-aminomethyl-benzoylamino)-benzene-1-sulphonic acid. | 1-(3'-chloro-phenyl)-3-methyl-5-pyraz-olone. | yellow. |
| 11 | ----do---- | 1-(2'.5'-dichloro-4'-sulphophenyl)-3-methyl-5-pyraz-olone. | Do. |
| 12 | 2-amino-benzene-1-sulphonic acid. | 2-(4'-butyl-3'-chloro-acetylaminomethyl-benzoylamino)-5-hydroxy-naphthalene-7-sulphonic acid. | orange. |
| 13 | ----do---- | 2-(4'-methoxy-3'-chloro-acetylamino-methyl-benzoyl-amino)-8-hydroxy-naphthalene-6-sulphonic acid. | Do. |
| 14 | 2-amino-5-acetyl-amino-benzene-1-sulphonic acid. | 2-(4'-methyl-3'-chloro-acetylaminomethyl-benzoylmino)-5-hydroxy-naphthalene-7-sulphonic acid. | Do. |
| 15 | 2-amino-benzene-1-sulphonic acid. | 1-(4'-methoxy-3'-chloro-acetylaminomethyl-benzoylamino)-8-hydroxy-naphthalene-4.6-disulphonic acid. | bluish-red. |
| 16 | 2-amino-5-(4'-methyl-3'-chloro-acetyl-aminomethyl-benzoylamino)-benzene-1-sulphonic acid. | 1-hydroxy-naphthalene-3-sulphonic acid. | red-orange. |
| 17 | 2-amino-4-(3'.4'-dimethyl-6'-chloro-acetylamino-methyl-phenoxy-acetylamino)-benzene-1-sulphonic acid. | ----do---- | Do. |
| 18 | 2-amino-benzene-1-sulphonic acid. | 2-(4'-ethoxy-3'-chloro-acetaminomethyl-benzoylamino)-8-hydroxy-naphthalene-6-sulphonic acid. | red-orange. |
| 19 | 4-amino-diphenyl-ether-3-sulphonic acid. | 1-(4'-x'-di-chloro-acetaminomethyl-phenylacetyl-amino)-8-hydroxy-naphthalene-4.6-disulphonic acid. | bluish-red. |
| 20 | 5-(4'-methyl-3'-chloro-acetaminomethyl-phenylacetyl amino)-2-amino-benzene-1-sulphonic acid. | 2-carbobutoxyamino-8-hydroxy-naphthalene-6-sulphonic acid. | red-orange. |
| 21 | 5-(4'-ethoxy-3'-chloro-acetylaminomethyl-benzoylamino)-2-aminobenzene-1-sulphonic acid. | 2-(4'-methyl-3'-chloro-acetyl-aminomethyl-benzoylamino)-5-hydroxy-naphthalene-7-sulphonic acid. | Do. |
| 22 | 2-amino-benzene-1-sulphonic acid. | 1-[4'-(4''-chloro-acetylamino-methyl-phenyl)-phenoxy-acetyl-amino]-8-hydroxy-naphthalene-3.6-disulphonic acid. | bluish-red. |
| 23 | ----do---- | 1-(4'-methyl-3'-chloro-acetylaminomethyl-benzoylamino)-8-hydroxy-naphthalene-4.6-disulphonic acid. | Do. |

What we claim is:

1. The monoazo dyestuff of the formula:

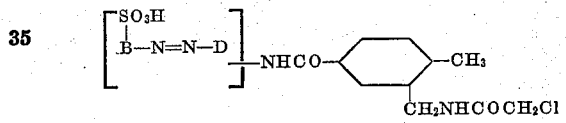

wherein B represents a mononuclear carbocyclic aryl radical containing the sulpho group in o-position to the azo group, and D represents a naphtholic coupling component.

2. The monoazo dyestuff of the formula:

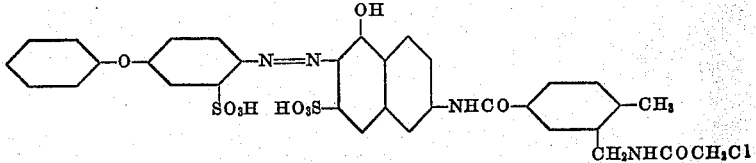

3. The monoazo dyestuff of the formula:

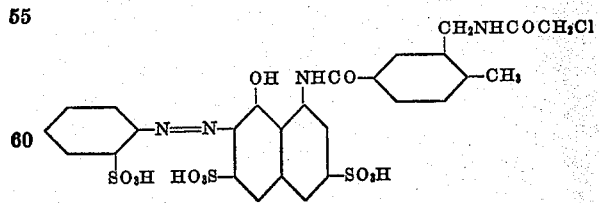

4. The monoazo dyestuff of the formula:

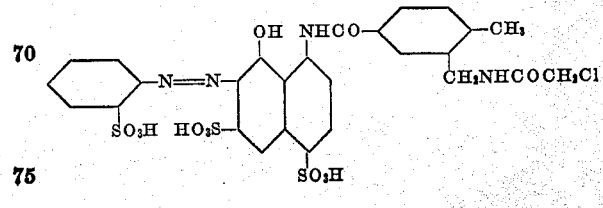

5. The monoazo dyestuff of the formula:
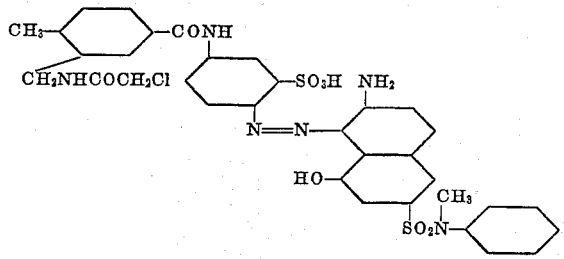
6. The monoazo dyestuff of the formula:
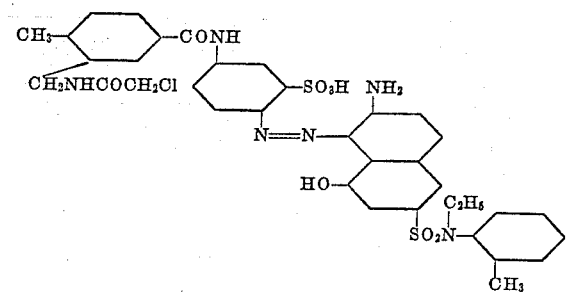
No references cited.